United States Patent
Keller et al.

(10) Patent No.: US 10,742,525 B2
(45) Date of Patent: Aug. 11, 2020

(54) SYSTEMS AND METHODS FOR SYNTHESIZING RESOURCE TEMPLATES USING COMPOSABLE PARTS

(71) Applicant: Citrix Systems, Inc., Fort Lauderdale, FL (US)

(72) Inventors: Steven A. Keller, Coral Springs, FL (US); Thomas J. Hammond, Coconut Creek, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 302 days.

(21) Appl. No.: 15/654,517

(22) Filed: Jul. 19, 2017

(65) Prior Publication Data

US 2019/0028364 A1 Jan. 24, 2019

(51) Int. Cl.
*G06F 15/173* (2006.01)
*H04L 12/24* (2006.01)
*G06F 9/455* (2018.01)

(52) U.S. Cl.
CPC ...... *H04L 41/5054* (2013.01); *G06F 9/45558* (2013.01); *H04L 41/08* (2013.01); *H04L 41/0813* (2013.01); *H04L 41/0843* (2013.01); *G06F 2009/4557* (2013.01); *G06F 2009/45575* (2013.01)

(58) Field of Classification Search
CPC . H04L 41/5054; H04L 41/08; H04L 41/0813; H04L 41/0843; G06F 9/45558; G06F 2009/4557; G06F 2009/45575
USPC .......................................................... 709/226
See application file for complete search history.

(56) References Cited

U.S. PATENT DOCUMENTS

| | | | | |
|---|---|---|---|---|
| 8,331,362 B2* | 12/2012 | Shukla | ............... | H04L 41/0843 370/389 |
| 8,588,225 B1* | 11/2013 | Ganesan | ............. | H04L 41/5054 370/389 |
| 2012/0072597 A1* | 3/2012 | Teather | ................. | G06F 9/5072 709/226 |
| 2014/0365662 A1* | 12/2014 | Dave | .................... | G06F 9/45533 709/226 |
| 2016/0197880 A1* | 7/2016 | Korman | ................. | H04L 41/12 709/226 |

* cited by examiner

*Primary Examiner* — Atta Khan
(74) *Attorney, Agent, or Firm* — Foley & Lardner LLP (57) ABSTRACT

Described embodiments automatically and dynamically generate and update resource templates for deployable resources, utilizing composable parts that may be dynamically replaced. Common portions of the templates may be easily defined once and reused multiple times, reducing risk of error and ensuring stability and cross-resource compatibility. Each dynamic template may have replaceable parts, as well as replaceable parameters and values within the replaceable parts, as well as in common portions of the template. The replacement properties and values may be determined at runtime or during deployment, ensuring that configurations are always current.

5 Claims, 3 Drawing Sheets

FIG. 3

SYSTEMS AND METHODS FOR SYNTHESIZING RESOURCE TEMPLATES USING COMPOSABLE PARTS

FIELD OF THE DISCLOSURE

The present application generally relates to management and deployment of virtual computing environments.

BACKGROUND OF THE DISCLOSURE

Virtual computing environments, sometimes referred to as hosted environments, hosted desktops or servers, cloud computing environments, virtual processing environments, virtual storage environments, deployable resources, or by similar terms, allow remote execution and processing of computationally intensive tasks and control over deployable services. These environments may include virtual machines, virtual storage devices, virtual networks, databases, web applications, servers of different types, or any other type and form of deployable resource. These environments may be dynamically deployed (e.g. instantiating virtual machines or servers, beginning execution of the hosted environment, etc.) or undeployed (e.g. stopping or terminating execution of the hosted environment, etc.).

Resources are typically deployed according to configuration files or templates with entries specifying various features and parameters of the resource, such as names, addresses, group memberships, types, or other such features. Particularly for large organizations, these templates may be complex and numerous. Maintaining and updating templates may require significant time and effort, and inadvertent typographical errors in a template may result in drastic consequences for the organization, including data loss or lack of stability.

BRIEF SUMMARY OF THE DISCLOSURE

The systems and methods discussed herein provide for automatic generation and updating of resource templates for deployable resources, utilizing composable parts that may be dynamically replaced. Common portions of the templates may be easily defined once and reused multiple times, reducing risk of error and ensuring stability and cross-resource compatibility. Each dynamic template may have replaceable parts, as well as replaceable parameters and values within the replaceable parts, as well as in common portions of the template. The replacement properties and values may be determined at runtime or during deployment, ensuring that configurations are always current.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Virtual computing environments, sometimes referred to as hosted environments, hosted desktops or servers, cloud computing environments, virtual processing environments, virtual storage environments, deployable resources, or by similar terms, allow remote execution and processing of computationally intensive tasks and control over deployable services. These environments may include virtual machines, virtual storage devices, virtual networks, databases, web applications, servers of different types, or any other type and form of deployable resource. These environments may be dynamically deployed (e.g. instantiating virtual machines or servers, beginning execution of the hosted environment, etc.) or undeployed (e.g. stopping or terminating execution of the hosted environment, etc.).

Resources are typically deployed according to configuration files or templates with entries specifying various features and parameters of the resource, such as names, addresses, group memberships, types, or other such features. Particularly for large organizations, these templates may be complex and numerous. For example, within the Azure Cloud Platform provided by Microsoft, Inc., a JavaScript Object Notation (JSON) file is used to describe resources that are deployed within the platform, and is referred to as an Azure Resource Manager Template. The Azure Resource Manager Template contains definitions for all items being deployed, which may be dozens, hundreds, thousands of resources or more. When multiple resources of the same type (e.g. storage, virtual machine, etc.) are utilized, these definitions may be highly repetitive. For example, an organization may deploy a hundred virtual machines for developers that are identical except for names and addresses. Template entries for these machines may be long and detailed, even if they are 90% identical. Maintaining and updating templates may require significant time and effort, and inadvertent typographical errors in a template may result in drastic consequences for the organization, including data loss or lack of stability.

The systems and methods discussed herein provide for automatic generation and updating of resource templates for deployable resources, utilizing composable parts that may be dynamically replaced. Common portions of the templates may be easily defined once and reused multiple times, reducing risk of error and ensuring stability and cross-resource compatibility. Each dynamic template may have replaceable parts, as well as replaceable parameters and values within the replaceable parts, as well as in common portions of the template. The replacement properties and values may be determined at runtime or during deployment, ensuring that configurations are always current.

Although examples are primarily discussed in connection with Azure Resource Manager and Azure resource templates, the systems and methods discussed herein may be readily applied to any deployable resource system utilizing configuration files, including Amazon S3 or Elastic Compute Cloud (EC2), Google Cloud Platform, IBM Bluemix, or any other type and form of deployable resource or environment management system.

Figure 1:
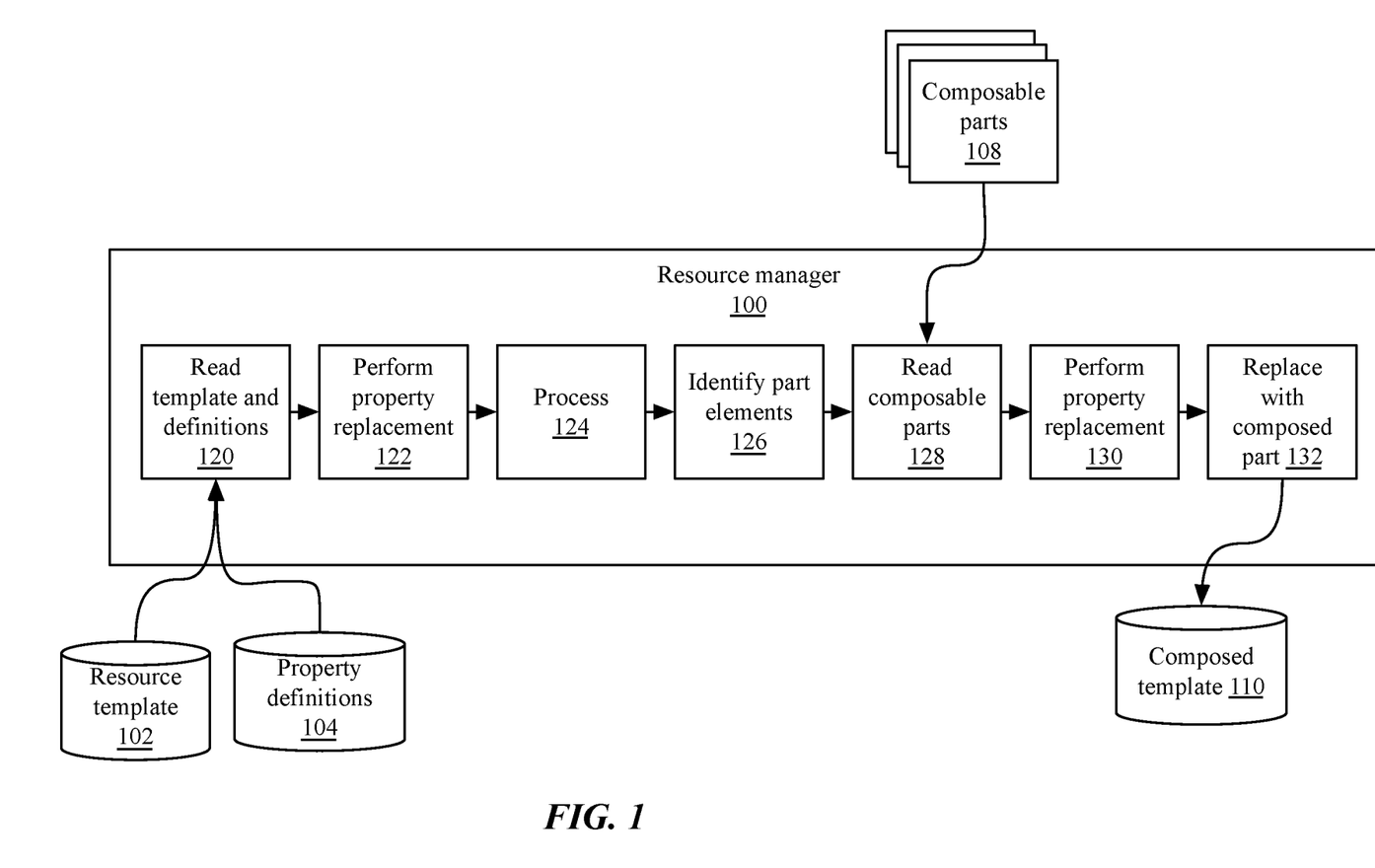
FIG. 1 is a block diagram of an embodiment of a system for synthesizing templates using composable parts.

FIG. 1 is a block diagram of an embodiment of a system for synthesizing templates using composable parts. A resource manager 100 may receive resource template(s) 102 and property definition(s) 104 from storage, which may be internal to the resource manager 100 or external (e.g. accessible via a local serial connection, local network, or wide area network), or may receive resource template(s) 102 and property definition(s) 104 from a client computing device or computing device of an administrator or user (not illustrated).

A resource template 102 may be referred to as an initial template, and may be in any type and format. For example, in some implementations, the initial template may comprise JSON syntax and expressions, such as an Azure Resource Manager template. In other implementations, the initial template may comprise XML data. An excerpted portion of an example of an initial template 102 is illustrated below:

```
"variables": {
    "vmssApiVersion": "[vmssApiVer]",
},
"resources": [
    {
        "PartSource": "storage.json",
        "PartPath": "$/Resources/diagnosticStorage",
        "Replacements": {
            "nodeName": "0"
        }
    },
    {
        "PartSource": "storage.json",
        "PartPath": "$/Resources/diagnosticStorage",
        "Replacements": {
            "nodeName": "1"
        }
    }
]
```

The initial template 102 may include one or more variables, which may be defined via property definitions 104 retrieved from storage or received from a client computing device. Property definitions may be in a similar syntax or language as the template 102, in many implementations. For example, a property definition 104 for the above example initial template may include:

```
{
    "vmssApiVer": "2016-03-30",
}
```

As shown in block 120, the resource manager 100 may receive or retrieve the initial template 102 and property definitions 104; and in block 122, the resource manager may replace variables in the initial template with properties in the property definitions 104 to create an updated template. For example, using the above examples, the updated template may comprise:

```
"variables": {
    "vmssApiVersion": "2016-03-30",
},
"resources": [
    {
        "PartSource": "storage.json",
        "PartPath": "$/Resources/diagnosticStorage",
        "Replacements": {
            "nodeName": "0"
        }
    },
    {
        "PartSource": "storage.json",
```
-continued
```
        "PartPath": "$/Resources/diagnosticStorage",
        "Replacements": {
            "nodeName": "1"
        }
    }
]
```

In the above example, the value of the variable vmssApiVersion has been replaced according to the property definition 104.

At block 124, the resource manager 100 may process the updated initial template according to standard processing rules for the environment. For example, for templates in the Azure Resource Manager template format, the resource manager 100 may process the template as a single extended string of JSON.

At block 126 or as part of processing at block 124, part elements, sometimes referred to as dynamic tags, in the updated initial template may be identified. A part element or dynamic tag may comprise a predetermined tag or string to identify a portion of the template that may be replaced with a composable part. In some implementations, such as the example excerpt provided above, these part elements or dynamic tags may be identified by a predetermined name or portion of a name, such as 'part' (e.g. PartSource, PartPath, etc.).

At block 128, composable parts 108 identified by the extracted part elements or dynamic tags may be retrieved from storage or received from a client computing device. Each composable part 108 may be identified by an address, filename, URL, or other identifier for retrieval. For example, in the excerpt provided above, each part is identified via a file name (e.g. "storage.json") and a path to the file (e.g. "$/Resources/diagnosticStorage"). In some implementations, each part may be stored in separate files. In other implementations, multiple parts may be stored within a single file and an address, name, or path may specify a portion of the file (e.g. an XML file could include separate portions with deliniating tags for "part1", "part2", etc.).

A composable part 108 may be in a similar syntax or format as the template 102 and property definitions 104. For example, a composable part 108 for the excerpt provided above may include:

```
{
    "apiVersion": "[variables('storageApiVersion')]",
    "type": "Microsoft.Storage/storageAccounts",
    "name":
"[parameters('ScaleSetDiagnosticsStorageAccountName[nodeName]')]",
    "location": "[resourceGroup( ).location]",
    "properties": {
        "accountType":
"[parameters('applicationDiagnosticsStorageAccountType')]"
    },
    "tags": {
        "resourceType": "Service Fabric",
        "clusterName": "[parameters('clusterName')]"
    }
}
```

As with initial template 102, the composable parts may include variables that may be defined in property definitions 104 or template 102. For example, as shown above, initial template 102 includes the object "Replacements" and entity "nodeName" with values 0 and 1. Thus, in the excerpt composable part 108 shown above, the variable [nodeName] may be replaced with the corresponding value by the resource manager. In this example, the composable part is retrieved twice, as the initial template includes two instances of resources with the same part name and path. The resulting modified or updated composable part becomes:

```
{
        "apiVersion": "[variables('storageApiVersion')]",
        "type": "Microsoft.Storage/storageAccounts",
        "name":
"[parameters('ScaleSetDiagnosticsStorageAccountName0')]",
        "location": "[resourceGroup( ).location]",
        "properties": {
            "accountType":
"[parameters('applicationDiagnosticsStorageAccountType')]"
        },
        "tags": {
            "resourceType": "Service Fabric",
            "clusterName": "[parameters('clusterName')]"
        }
    }
{
        "apiVersion": "[variables('storageApiVersion')]",
        "type": "Microsoft.Storage/storageAccounts",
        "name":
"[parameters('ScaleSetDiagnosticsStorageAccountName1')]",
        "location": "[resourceGroup( ).location]",
        "properties": {
            "accountType":
"[parameters('applicationDiagnosticsStorageAccountType')]"
        },
        "tags": {
            "resourceType": "Service Fabric",
            "clusterName": "[parameters('clusterName')]"
        }
    }
}
```

At block 132, the elements in the updated initial template may be replaced with the corresponding updated composable part to generate a composed template 110:

```
    "variables": {
    "vmssApiVersion": "2016-03-30",
    },
    "resources": [
        {
            "apiVersion": "[variables('storageApiVersion')]",
            "type": "Microsoft.Storage/storageAccounts",
            "name":
"[parameters('ScaleSetDiagnosticsStorageAccountName0')]",
            "location": "[resourceGroup( ).location]",
            "properties": {
                "accountType":
"[parameters('applicationDiagnosticsStorageAccountType')]"
            },
            "tags": {
                "resourceType": "Service Fabric",
                "clusterName": "[parameters('clusterName')]"
            }
        },
        {
            "apiVersion": "[variables('storageApiVersion')]",
            "type": "Microsoft.Storage/storageAccounts",
            "name":
"[parameters('ScaleSetDiagnosticsStorageAccountName1')]",
            "location": "[resourceGroup( ).location]",
            "properties": {
                "accountType":
"[parameters('applicationDiagnosticsStorageAccountType')]"
            },
            "tags": {
                "resourceType": "Service Fabric",
                "clusterName": "[parameters('clusterName')]"
            }
        }
    ]
```

The composed template 110 may now be deployed provided to a deployment server or environment manager to instantiate virtual machines and services according to the template, or may be stored for future deployment.

Figure 2:
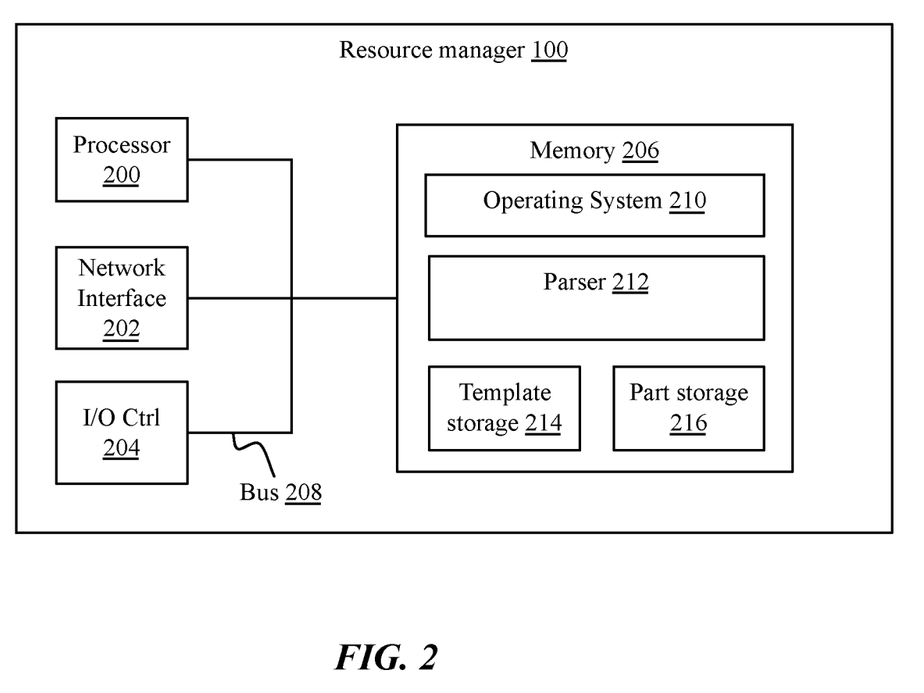
FIG. 2 is a block diagram of an embodiment of a computing device for synthesizing templates using composable parts.

Referring to FIG. 2, an embodiment of a computing device is depicted, such as a resource manager 100, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface xx18 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIG. 2 may operate under the control of an operating system 210, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The computing device may execute one or more of a parser 212, and may maintain or communicate with template storage 214 and/or part storage 216. In other implementations, other software may be executed by the computing device, including web browsers, configuration applications, text editors or template editors, virtual machine servers, hypervisors, authentication or log-in agents, monitoring systems, or other such features.

A parser 212 may comprise an application, service, server, daemon, agent, routine, or other executable logic for retrieving or receiving templates and composable parts from template storage 214 and/or part storage 216, parsing the template or composable part to identify replaceable variables or properties and/or replaceable tags for composable parts. In some implementations, parser 212 may comprise a regular expression (regex) processor with a set of rules to identify replaceable properties and parts. For example, parser 212 may comprise a search and replace function with rules to replace a variable identified or bounded by a predetermined character or characters (e.g. "[" and/or "]") with a corresponding defined property. As discussed above, parser 212 may receive initial templates and replace variables in the templates with values defined in property definitions. Parser 212 may also identify tags or identifiers of composable parts, retrieve the corresponding parts, replace variables in the parts with values defined in property definitions and/or the initial template, and replace the tags or identifiers with the modified or updated composable parts to generate the final template.

Template storage 214 and/or part storage 216 may comprise any type and form of storage file, such as a database, flat file, set of files in a directory, or any other type and form of data format for storing initial templates, property definitions, and/or composable parts. In some implementations, template storage 214 and/or part storage 216 may be stored in an internal storage device of resource manager 100, an external storage device connected to resource manager 100, or a networked storage device in communication with resource manager 100 via one or more networks. In some implementations, template storage 214 and/or part storage 216 may be stored in a storage device of a second computing device, such as a client or user computing device, a server computing device, an administrator or manager computing device, or any other type and form of computing device. In some implementations, an initial template or property definitions may be received from a client device, and modified with parts stored in part storage 216.

Figure 3:
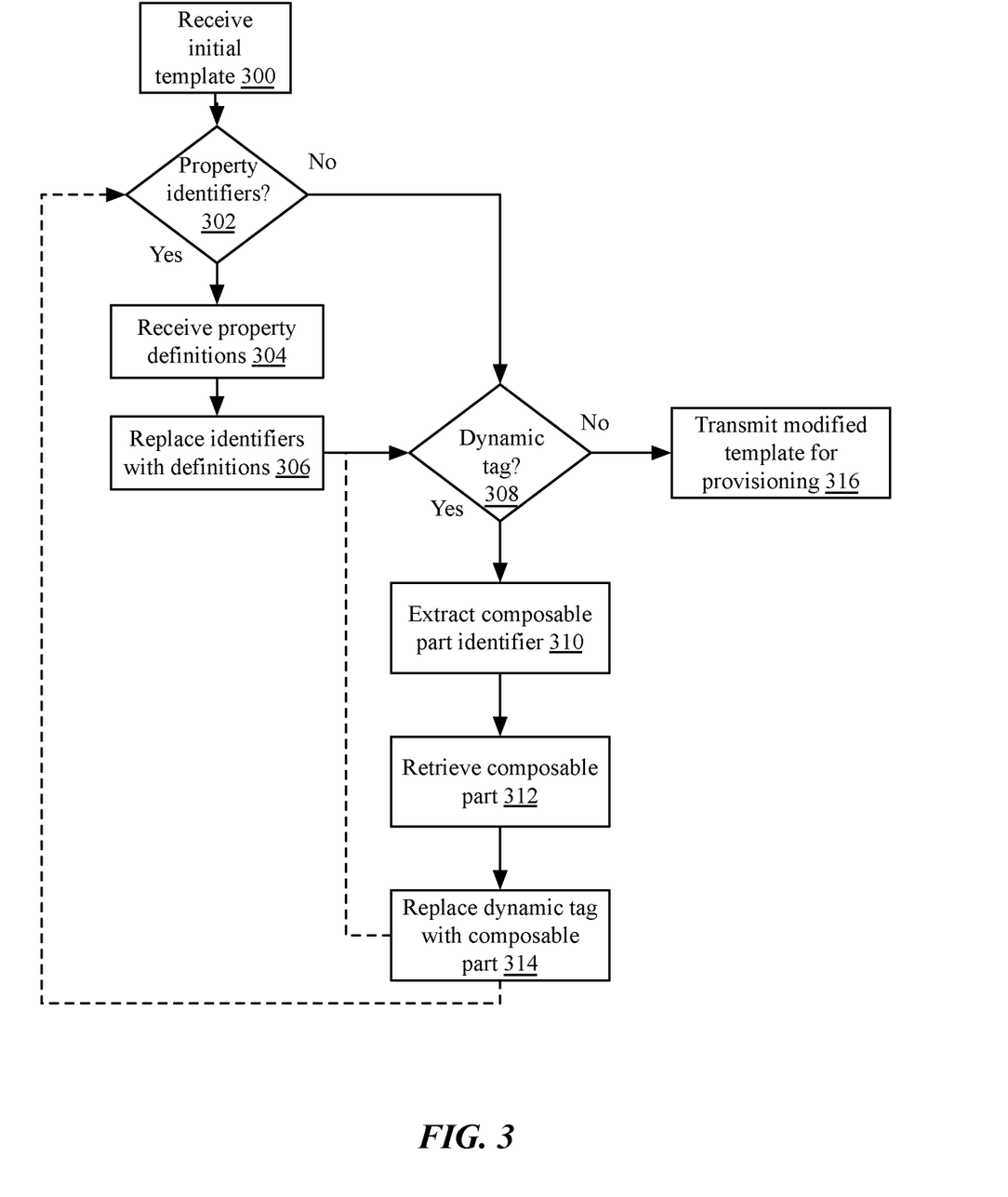
FIG. 3 is a flowchart of a method for synthesizing templates, according to some embodiments.

FIG. 3 is a flowchart of a method for synthesizing templates, according to some embodiments. At step 300, a resource manager may receive an initial template. The initial template may be received from a client computing device, or retrieved from a local or remote storage device or computing device. In some implementations, a client computing device may transmit a request for a template to the resource manager, which may then retrieve an initial template from a separate remote computing device.

At step 302, the resource manager may scan the initial template for an identifier of a replaceable or definable property or variable. As discussed above, scanning the template may comprise processing the initial template via a regex processor to identify one or more identifiers of replaceable or definable properties or variables. At step 304, the resource manager may receive one or more property definitions corresponding to the identified replaceable or definable properties or variables. Each definition may comprise an identifier of a property or variable and a corresponding value or string to replace or add to the identified property or variable. Although shown after step 302, in some implementations, the property definitions may be received or retrieved at step 300 or 302. At step 306, the resource manager may replace the identifiers with the corresponding values or strings from the property definitions. In some implementations, the resource manager may identify a plurality of identifiers at step 302, and then replace the plurality of identifiers at step 306. In other implementations, steps 302-306 may be performed iteratively for each identifier, replacing the identifier before continuing scanning the initial template.

If no property identifiers are found at step 302 (or no more property identifiers are found when iteratively repeating steps 302-306) or once all identifiers have been replaced at step 306, then at step 308, the resource manager may identify a part element or dynamic tag in the template. As discussed above, identifying the dynamic tag may comprise searching the template for a predetermined string or expression matching a regex filter or similar identifier. Once identified, at step 310, the resource manager may extract a composable part identifier from the dynamic tag. As discussed above, composable part identifiers may comprise addresses, names, paths, URLs, or other identifiers of composable parts to be retrieved and/or modified.

At step 312, the resource manager may retrieve the corresponding composable part at the address or location or file identified in the composable part identifier. Retrieving the composable part may comprise searching a directory, file, database, or other data structure on a local or remote storage device, or requesting the file from a file server, web server, or similar server computing device.

At step 314, the resource manager may replace the dynamic tag in the template with the retrieved composable part. Replacing the tag may comprise removing identifiers of the tag and/or contents of the tag, and inserting the retrieved composable part into the template.

As discussed above, in some implementations, composable parts may themselves include variables or replaceable properties. Accordingly, in some such implementations, after replacing the dynamic tag with a composable part at step 314, steps 302-306 may be performed on the dynamic tag to identify such variables or replaceable properties and replace them according to definitions in the property definitions or dynamic tag. As shown, in some implementations, steps 302-306 may be performed after step 314. In other implementations, as discussed above in connection with FIG. 1, the variables in the composable part may be replaced prior to replacing the dynamic tag in the template; accordingly, in such implementations, steps 302-306 may be performed on the composable part prior to step 314.

In some implementations, steps 308-314 may be repeated iteratively for additional composable parts and dynamic tags. In other implementations, steps 308-314 may be performed in a single pass, with all dynamic tags identified at step 308, identifiers extracted at step 310, parts retrieved at step 312, optionally processed for variables as discussed above, and replaced at step 314. In still other implementations, some tags and composable parts may be processed together, while other tags and composable parts are processed iteratively in sequence (for example, all tags in a single entity or resource may be processed together, in some implementations).

Once all composable parts have been inserted and potentially updated as discussed above, then the modified template, now comprising a final configuration file or deployable configuration script, is complete. At step 316, the modified template may be transmitted to a deployment engine or device for provisioning. For example, the modified template may be provided to a virtual environment manager, such as an Azure Resource Manager or CloudFormation service provided by Amazon Web Services, to configure and deploy resources. As discussed above, the template may include configuration instructions for virtual machines, virtual networks or virtual network devices, virtual storage devices, servers, services, or any other such instructions. The virtual environment manager utilize the configuration instructions to instantiate or deploy the virtual devices or services automatically, rather than requiring a user to manually configure and deploy each virtual device or service individually.

For example, in one implementation, the system may use an initial template, property definitions, and composable parts to dynamically generate different final templates for a plurality of virtual devices or networks being deployed for a plurality of different work locations of an enterprise. Each final template may be similar in some respects due to commonalities in the initial template and composable parts, and yet different and unique in other respects due to the dynamically applied property definitions. The administrator may subsequently update the configuration of every device or network by making changes to a composable part and having those changes duplicated and dynamically modified to each final template. Thus, a large and complex deployment may be maintained easily and efficiently.

Accordingly, the systems and methods discussed herein provide for dynamically generated configuration files or templates for deploying virtual resources or environments, with common parts, dynamically editable variables and composable parts comprising code or configuration snippets that may be dynamically retrieved and inserted into an initial template to create a unique final configuration template or file. Typographical errors that can cause instabilities and cross-environment incompatibilities are avoided, and the complexity of configurations may be dramatically reduced, providing easier maintenance and setup. Storage may also be reduced, by replacing a large number of similar configuration templates with a single template and smaller set of composable parts. The dynamic templates may be faster to retrieve and generate, in some implementations, compared to searching through a very large number of unique individual templates.

In one aspect, the present disclosure is directed to a method for provisioning computer system resources via a dynamic template. The method includes receiving, by a resource manager executed by a device, a first template comprising a first one or more resource identifiers and one or more dynamic tags each comprising an identifier of a composable part comprising a second one or more resource identifiers. The method also includes identifying, by the resource manager, a first dynamic tag in the first template. The method also includes retrieving, by the resource manager, the composable part identified in the first dynamic tag. The method also includes replacing, by the resource manager, the first dynamic tag in the first template with the retrieved composable part to create a modified template. The method also includes transmitting, by the resource manager, the modified template to a server, the modified template used to provision one or more resources.

In some implementations of the method, the first dynamic tag further comprises an address of the composable part. In a further implementation, the method includes retrieving the composable part identified in the first dynamic tag by retrieving the identified composable part at the corresponding address. In some implementations, the first dynamic tag further comprises an identification of a replacement property. In a further implementation, the method includes replacing a variable in the identified composable part with the identified replacement property.

In some implementations, each of the first and second one or more resource identifiers comprise identifiers of virtual machines, databases, virtual networks, or web applications. In some implementations, the first template further comprises one or more property identifiers. In a further implementation, the method includes receiving, by the resource manager, a set of property definitions; and replacing, by the resource manager, the one or more property identifiers in the first template with corresponding definitions from the set of property definitions.

In some implementations, retrieving the composable part identified in the first dynamic tag includes transmitting a request, via a network interface, to a storage device storing the composable part; and receiving the composable part, via the network interface, responsive to the request.

In another aspect, the present disclosure is directed to a system for provisioning resources of a computer system. The system includes a memory device storing a first template comprising a first one or more resource identifiers and one or more dynamic tags each comprising an identifier of a composable part comprising a second comprising one or more resource identifiers. The system also includes a resource manager executable on a processor. The resource manager is configured to retrieve the first template from the memory device, and identify a first dynamic tag in the first template. The resource manager is also configured to retrieve the composable part identified in the first dynamic tag. The resource manager is also configured to replace the dynamic tag in the first template with the retrieved composable part to create a modified template. The resource manager is also configured to transmit the modified template to a server, the modified template used to provision one or more resources.

In some implementations, the first dynamic tag further comprises an address of the composable part. In some further implementations, the resource manager is further configured to retrieve the identified composable part at the corresponding address. In some implementations, the first dynamic tag further comprises an identification of a replacement property. In some further implementations, the resource manager is further configured to replace a variable in the identified composable part with the identified replacement property.

In some implementations, each of the first and second one or more resource identifiers comprise identifiers of virtual machines, databases, virtual networks, or web applications. In some implementations, the first template further comprises one or more property identifiers. In some further implementations, the resource manager is further configured to receive a set of property definitions, and replace the one or more property identifiers in the first template with corresponding definitions from the set of property definitions.

In some implementations, the system includes a network interface; and the resource manager is further configured to transmit a request, via the network interface, to a storage device storing the composable part; and receive the composable part, via the network interface, responsive to the request.

In another aspect, the present application is directed to a method for provisioning computer system resources via a dynamic template. The method includes configuring a computer memory according to a first template, comprising a first one or more resource identifiers and one or more dynamic tags each comprising an identifier of a composable part comprising a second one or more resource identifiers. The method also includes reconfiguring the computer memory by, for each of the one or more dynamic tags: identifying said dynamic tag in the first template; retrieving the composable part identified in the said dynamic tag; and replacing the said dynamic tag in the first template with the retrieved composable part to create a modified template.

In some implementations, each dynamic tag of the one or more dynamic tags further comprise an address of the corresponding composable part and at least one replacement property; and reconfiguring the computer memory includes, for each of the one or more dynamic tags: retrieving the composable part at the address; and replacing a variable in the composable part with the identified replacement property, the modified composable part replacing the dynamic tag in the first template.

Although the disclosure may reference one or more "users", such "users" may refer to user-associated devices, for example smart phones and tablets. It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for provisioning computer system resources via a dynamic template, comprising:
   receiving, by a resource manager executed by a device, a first template comprising a first one or more resource identifiers, one or more property identifiers, and one or more dynamic tags each comprising an identifier of a composable part comprising a second one or more resource identifiers; an address of the composable part; a set of property definitions; and an identification of a replacement property, wherein each of the first and second one or more resource identifiers comprise identifiers of virtual machines, databases, virtual networks, or web applications;
   identifying, by the resource manager, a first dynamic tag in the first template;
   retrieving, by the resource manager, the composable part at the address identified in the first dynamic tag;
   replacing, by the resource manager, a variable in the retrieved composable part with the identified replacement property;
   replacing, by the resource manager, the first dynamic tag in the first template with the retrieved composable part;
   replacing, by the resource manager, the one or more property identifiers in the first template with corresponding definitions from the set of property definitions to create a modified template; and transmitting, by the resource manager, the modified template to a server, the modified template used to provision one or more resources.

2. The method of claim 1, wherein retrieving the composable part identified in the first dynamic tag further comprises transmitting a request, via a network interface, to a storage device storing the composable part; and receiving the composable part, via the network interface, responsive to the request.

3. A system for provisioning resources of a computer system, comprising:

a memory device storing a first template comprising a first one or more resource identifiers, one or more property identifiers, and one or more dynamic tags each comprising an identifier of a composable part comprising a second one or more resource identifiers an address of the composable part a set of property definitions; and an identification of a replacement property, wherein each of the first and second one or more resource identifiers comprise identifiers of virtual machines, databases, virtual networks, or web applications; and a resource manager executable on a processor, configured to:

retrieve the first template from the memory device, identify a first dynamic tag in the first template, retrieve the composable part at the address identified in the first dynamic tag, replace a variable in the retrieved composable part with the identified replacement property, replace the dynamic tag in the first template with the retrieved composable part, replace the one or more property identifiers in the first template with corresponding definitions from the set of property definitions to create a modified template, and transmit the modified template to a server, the modified template used to provision one or more resources.

4. The system of claim 3, further comprising a network interface; and wherein the resource manager is further configured to:

transmit a request, via the network interface, to a storage device storing the composable part, and receive the composable part, via the network interface, responsive to the request.

5. A method for provisioning computer system resources via a dynamic template, comprising:

configuring a computer memory according to a first template, comprising a first one or more resource identifiers, one or more property identifiers, and one or more dynamic tags each comprising an identifier of a composable part comprising a second one or more resource identifiers an address of the composable part; a set of property definitions; and an identification of a replacement property, wherein each of the first and second one or more resource identifiers comprise identifiers of virtual machines, databases, virtual networks, or web applications; and reconfiguring the computer memory by, for each of the one or more dynamic tags:

identifying said dynamic tag in the first template, retrieving the composable part at the address identified in the said dynamic tag, replacing a variable in the retrieved composable part with the identified replacement property, replacing the said dynamic tag in the first template with the retrieved composable part, and replacing the one or more property identifiers in the first template with corresponding definitions from the set of property definitions to create a modified template.

* * * * *